(12) United States Patent
Byrne

(10) Patent No.: US 7,334,002 B2
(45) Date of Patent: Feb. 19, 2008

(54) SYSTEM AND METHOD FOR RECOVERY UNITS IN DATABASES

(75) Inventor: Peter Byrne, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 174 days.

(21) Appl. No.: 10/789,244

(22) Filed: Feb. 27, 2004

(65) Prior Publication Data

US 2005/0193035 A1    Sep. 1, 2005

(51) Int. Cl.
*G06F 17/30* (2006.01)
(52) U.S. Cl. .................. 707/202; 707/200; 711/156
(58) Field of Classification Search ............... None
See application file for complete search history.

(56) References Cited

U.S. PATENT DOCUMENTS 6,119,128 A * 9/2000 Courter et al. ............. 707/202
6,185,663 B1 * 2/2001 Burke ........................ 711/156

OTHER PUBLICATIONS

Mohan. C. et al., "ARIES: A Transaction Recovery Method Supporting Fine-Granularity Locking and Partial Rollbacks Using Write-Ahead Logging", *ACM Transactions on Database Systems*, Mar. 1992, 17(1), 94-162.

* cited by examiner

*Primary Examiner*—Charles Rones
*Assistant Examiner*—Belix M Ortiz
(74) *Attorney, Agent, or Firm*—Woodcock Washburn LLP

(57) ABSTRACT

The creation of multiple recoverable units within a database allows a database partition to be reconstructed during maintenance and disaster recovery operations. A method of creating a recovery unit includes partitioning a database into at least two recovery units. A primary catalog of metadata relating to the logical elements of a database such as tables, indexes, and file groups is created. A secondary catalog of metadata relating to the physical elements of a database such as pages, files, B-Trees, and log streams is created for each recovery unit. The primary and secondary metadata catalogs are linked such that only one log stream is associated with any one recovery unit. A single recovery unit may then be exercised to perform recovery or maintenance operations while the remaining recovery units of the database remain online.

16 Claims, 7 Drawing Sheets

SYSTEM AND METHOD FOR RECOVERY UNITS IN DATABASES

FIELD OF THE INVENTION

This invention relates in general to the field of computer databases. More particularly, this invention relates to the use of multiple independent recoverable units in a database structure.

BACKGROUND OF THE INVENTION

Most modern databases exhibit the characteristic of being either totally available or totally unavailable. Maintenance or disaster recovery schemes render the database unavailable during the time of maintenance or recovery. The unit of availability in such a scheme is the entire database. FIG. 1 depicts a prior art database 100, partitioned into tables A, B, and C, 101, 102, and 103 respectively. Each table uses a single log stream, 105, to log changes in row and other data to keep the database transactionally consistent. As the size of the database increases and as more tables are added to the database, a greater amount of data must be written to the log stream, 105. The log stream becomes a bottleneck that leads to significant manageability and performance issues that increasingly push the limits of the hardware the databases reside upon. Eventually, the database becomes bottlenecked by the limits of the single log stream and its accessibility and speed with regard to recovering database information.

One prior art option to this problem is to better manage the log stream by splitting up the single logs into multiple log streams. FIG. 2 depicts a database 200, partitioned into Tables D, E, and F, 201, 202, 203 respectively, and shared but separate log stream data sets 207, 208, and 209 respectively. In order to keep track and mange the log stream data sets, a co-ordination mechanism, 205 was introduced. However, as this solves the problem of bottlenecking of the log stream data, it generates another problem in that the coordination mechanism 205 is eventually subject to slowness as the size of the database grows. Also, the recovery of only a single table, for example Table D, 201, may require the use of multiple data log streams 207, 208, and 209 as the data log stream for Table D is distributed across all the data log streams. Although the architecture of FIG. 2 is an improvement of that of FIG. 1, it still has limiting speed performance due to the bottleneck of the coordination mechanism 205 and the entire database is still unavailable during a recovery operation involving the log data streams.

Thus, there is a need for an architecture that may allow for an improvement in speed with respect to performance bottlenecks and a desire to have a database be at least partially available during a recovery action. The present invention addresses the aforementioned needs and solves them with additional advantages as expressed herein.

SUMMARY OF THE INVENTION

The construction of multiple recoverable database partitions called recovery units in a database is useful for adding the capability to perform maintenance or disaster recovery on only one portion of a database while allowing other portions to be accessible. This may be especially useful in very large databases where the bottleneck of a single log stream or log stream coordination mechanism may slow down recovery operations. The method involves partitioning the database into multiple recovery units and creating a primary and secondary catalog of metadata.

The primary catalog may contain the logical elements of a recovery unit including references to the database, tables, indexes, filegroups, data types, constraints, stored procedures, triggers, and other identifiable database structures. A secondary catalog would be associated with each recovery unit and may include metadata concerning the physical elements of a recovery unit including files, pages, B-Trees, heaps, recovery units and log stream data.

After the primary and secondary catalogs are defined, the primary and secondary catalog are linked and a recovery unit may be exercised to perform maintenance or recovery operation on only one portion or recovery unit of the database while the other recovery units are accessible to users of the database. In one embodiment of the invention, a recovery unit may be used to copy one portion of a database to another thereby extending its utility beyond recovery purposes.

BRIEF DESCRIPTION OF THE DRAWINGS

The foregoing summary, as well as the following detailed description of preferred embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

An embodiment of the invention provides for multiple recovery units in a database that allows for addressing the bottleneck problems of the prior art and additionally provides the capability to increase overall database availability. This may be accomplished by having only parts of the database be unavailable during maintenance or disaster recovery scenarios. One aspect of invention provides for separation of metadata between logical elements of the database and physical elements. The logical elements include the database, tables, indexes, partitions of tables and indexes, data types, constraints, stored procedures, triggers, and filegroups that the user sees. The physical elements include the pages, files, B-trees, heaps, recovery units, and log which are invisible to the end user. Metadata representing the logical elements of the database are stored in a "primary" recovery unit, while the metadata for the physical elements of a database are stored in their own respective "secondary" recovery units. By maintaining this logical versus physical metadata approach consistently, an embodiment of the invention can provide separate logging updates to a single logical table or index in separate physical log streams.

After discussing an exemplary configuration using FIG. 3, exemplary methods and embodiments will be discussed in conjunction with FIGS. 4-7. An exemplary computing environment is also discussed in conjunction with FIG. 8.

Exemplary Embodiments of the Invention

Figure 1:
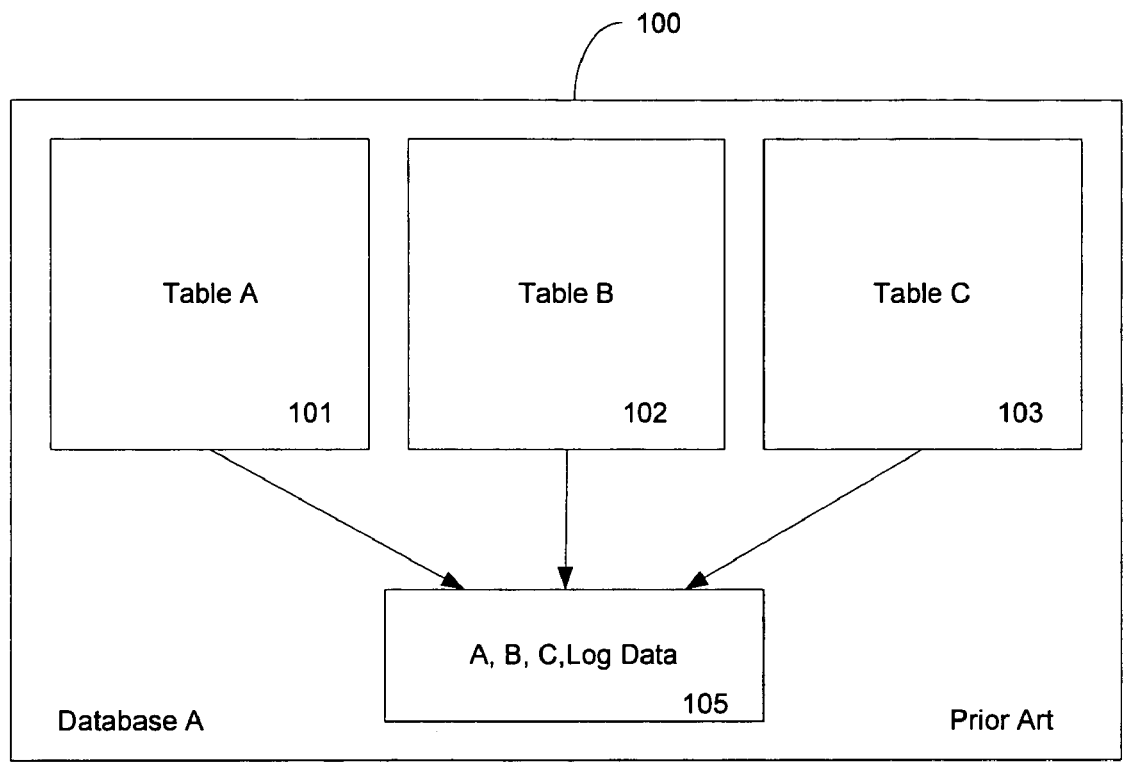
FIG. 1 is a block diagram of a partitioned prior art database.
Figure 2:
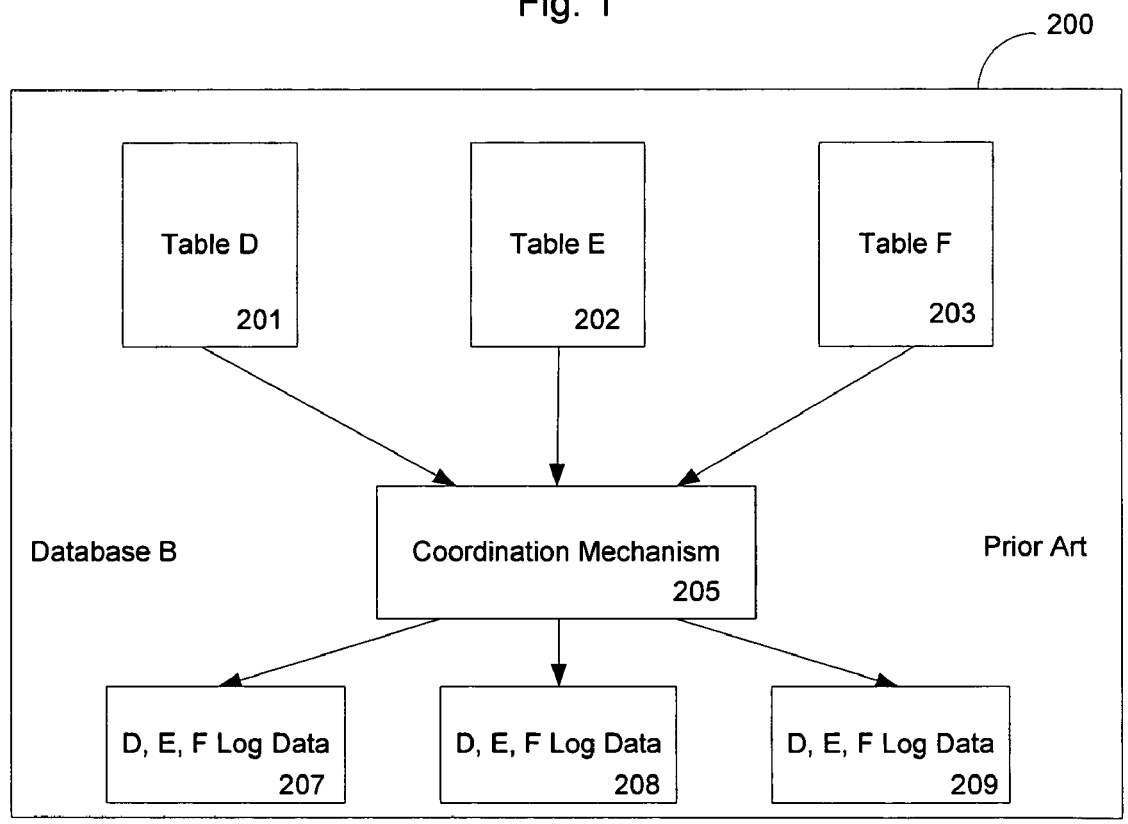
FIG. 2 is another block diagram of a partitioned prior art database.
Figure 3:
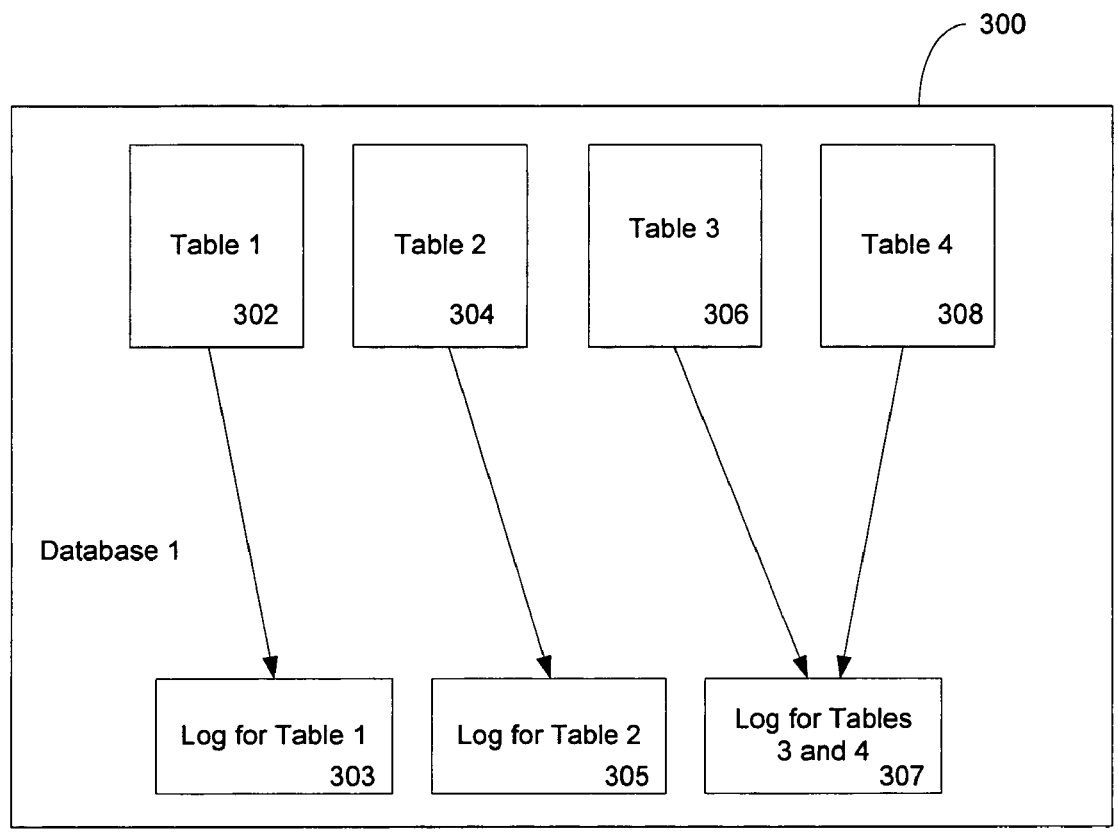
FIG. 3 is a block diagram depicting the log stream aspect of the present invention.

FIG. 3 illustrates a functional diagram of an embodiment of the present invention. The embodiment includes a database 300 where the data has been partitioned into multiple tables. FIG. 3 depicts four such tables, but the invention need not be so limited. The architecture provides that tables 302, 304, 306 and 308 have associated with them only one log data stream. Also, the log streams 303, 305 and 307 may function independently from one another. Thus, for example, Table 1 (302) associates only with a log data stream 303. Table 2 (304) associates only with log data stream 305. Table 3 (306) associates only with log data stream 307. Table 4 (308) associates only with log data stream 307. It can be noted that the tables 302, 304 and 306 of FIG. 4 may be any partitions of the database 300. The partitions may be a table, a fractional part of a table or an index of any data in the database.

The architecture of FIG. 3 allows for multiple data stream logs to support database 300 recovery operations. The architecture allows individual tables to be associated with only a single log, that is, a single table uses only one log data stream. This architecture permits the recovery of a single table or database partition by using the log data such that a recovery may be accomplished on only one table while leaving the other tables of the database accessible. The independence of the log streams and their close association with the partitions or tables eliminates the bottlenecks present in the prior art. Accordingly, there is a benefit of increased speed in both normal operations and recovery operations. Additionally, as will be described further herein, the architecture of FIG. 3 allows the transfer of one or more database partitions to another database.

One aspect of the present invention is that a single database may be broken into multiple database partitions termed recovery units. Each recovery unit has its own set of data files and log stream, and each can be recovered independently of the other recovery units in the database. A recovery unit is a collection of filegroups, files, and logs that are transactionally consistent because they share the same log. The tables and indexes in the database can be assigned or partitioned to different recovery units to divide up the workload among multiple log streams per database. Once the database is divided into these separate recovery units, the overall availability and performance of the database can be increased by the ability to restore and recover individual recovery units separately from the rest of the database. Only the database portion that resides on the recovery unit being restored is unavailable during recovery. The rest of the database remains usable.

In one embodiment, a method for the construction of recovery units is the separation of metadata between the logical elements of the database and the physical elements. Examples of the logical elements are the database, tables, indexes, data types, constraints, stored procedures, triggers, filegroups, and other database structures that a user sees. Examples of the physical elements are the pages, files, B-trees, heaps, recovery units, and log which may be invisible to an end user. In one embodiment, the metadata representing the logical elements of the database may be stored in a "primary" catalog, while the metadata for the physical elements of a database may each be stored in their own recovery units. By maintaining this logical and physical metadata approach consistently, at least one embodiment is able to separately log updates to a single logical table or index in separate physical log streams.

Figure 4:
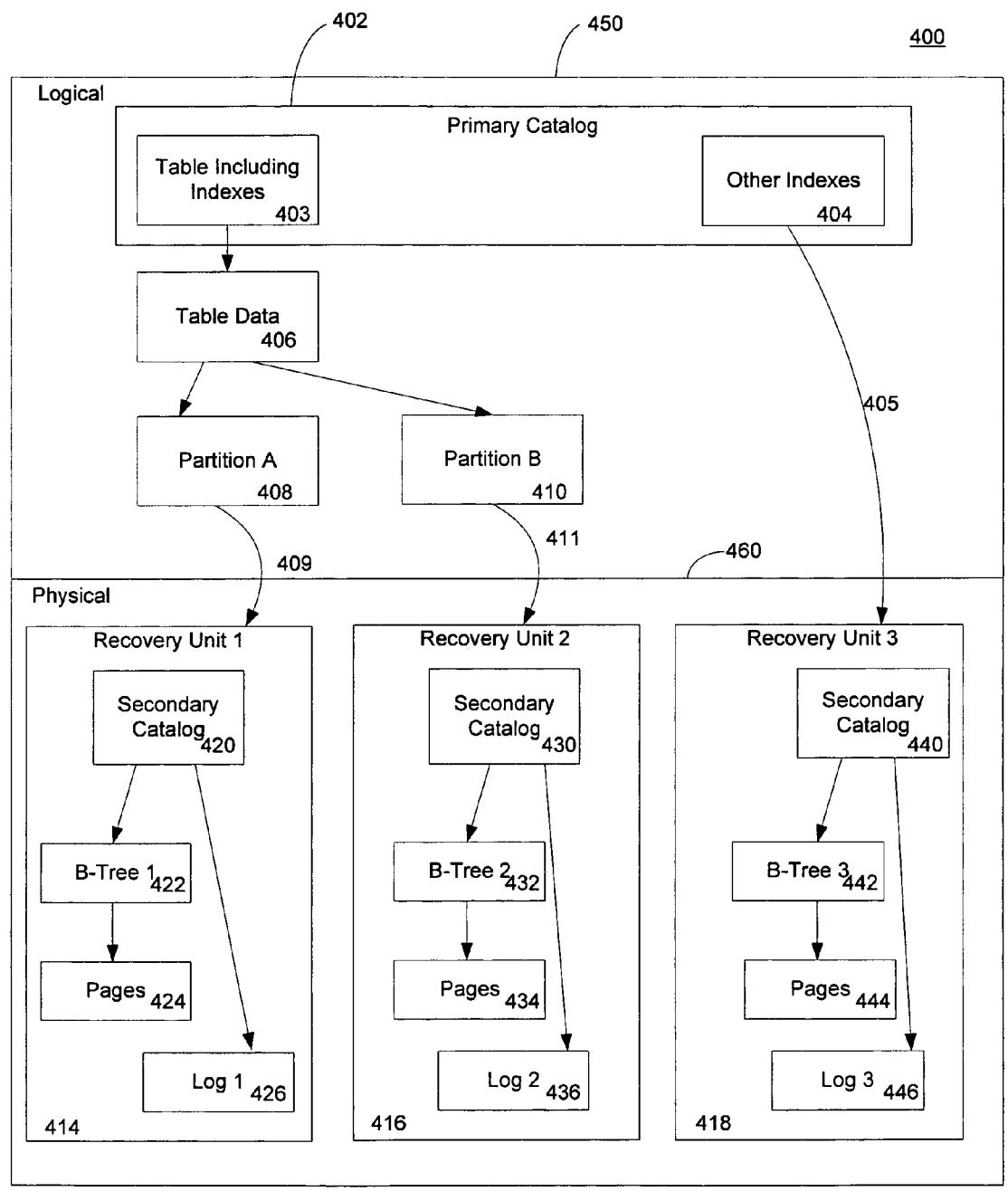
FIG. 4 is a block diagram depicting the metadata organization of the present invention.

FIG. 4 depicts the logical and physical metadata separation within one embodiment of the invention. The embodiment 400 depicts a database having a logical 450 and a physical 460 portions each having metadata associated with the scheme. In the logical layer 450, a primary catalog 402 may be constructed which contains metadata concerning the files and file groups of all of the tables, indexes, and partitions in the database. The metadata also contains an association between the files and file groups and the corresponding recovery unit identifiers. For example, the primary catalog may include metadata concerning the tables and indexes 403 of the table data 406 of the database. The table data 406 may be broken down into multiple database partitions 408, 410, each database partition may represent a table, an index, or any other data or metadata set. A primary catalog may also contain, among other forms of metadata, any other form of index 404 on information concerning the data contained in the database.

The primary catalog 402 may contain metadata concerning the linkage between data structures, such as database partitions 408, 410, and the associated recovery units and their respective identifiers. For example, a linkage 409 between the database partition 408 and the corresponding recovery unit 1 (414) may be in the primary catalog metadata. Similarly, linkages 411 and 405 may also be contained in the primary catalog metadata in order to correlate the logical layer 450 of the invention embodiment with the physical recovery units 416 and 418 respectively of the physical layer 460.

The physical layer 460 may include the physical recovery units. In the example of FIG. 4, there are three recovery units, but any number of recovery units may be established. In the example of FIG. 4, recovery unit 1 (414) is associated with database partition A 408, recovery unit 2 (416) is associated with database partition B 410 and recovery unit 3 is associated with miscellaneous indexes 404 of the primary catalog 450. Recovery unit 1 (414) may include a secondary catalog 420 which includes metadata of the physical elements of the database to which it refers. For example, a secondary catalog may include references to B-trees, files, pages, heaps, or log data. In the example embodiment of FIG. 4, the secondary catalog 420 contains references to B-Tree 1 (422), and pages 424 which make up the B-Tree. The secondary catalog also has reference metadata to the log 1 stream data 426 which is specifically associated with changes to the data of the recovery unit 1 referencing the database partition A 408 of the database. As a specific example, a row set identifier as well as recovery unit identifier may be passed to the secondary catalog when a rowset is opened in a database. This unique and dedicated linkage in the primary and secondary catalogs is what allows a recovery unit to be exercised to recover files, tables, indexes, and other database data independently of the other recovery units of the database.

Recovery units can do the REDO parts of a recovery operation without needing to interact with other parts of the database. For example, if recovery unit 1(414) is being used to recover aspects of its portion of the database, then recovery unit 2 (416) and recovery unit 3 (418) may remain online and active during the recovery unit 1 operation. Recovery units can also do most parts of logical UNDO recovery operation without interaction, but may need to contact other recovery units or databases to determine if a prepared transaction is either committed or aborted. This allows databases consisting of multiple physical recovery units to be available despite some physical recovery units not being present or recovered. Other physical recovery units may be restored and recovered while the database is online.

Figure 5:
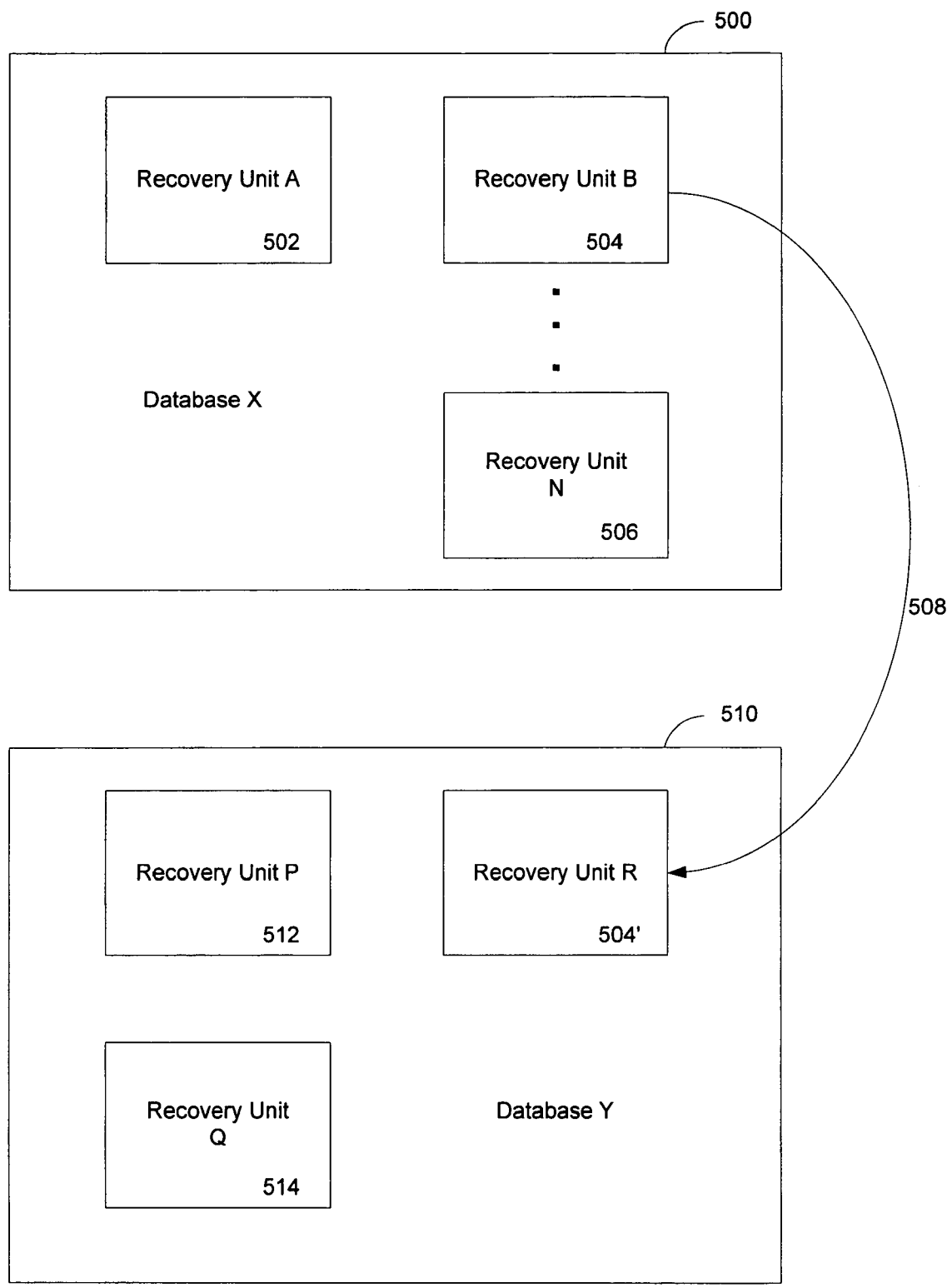
FIG. 5 is a block diagram depicting the recovery unit transfer aspect of the present invention.

The architecture of the exemplary embodiment shown in FIG. 4 provides a framework that allows the movement of database partitions between databases. As is well known, due to the reference ties to file identifiers on most pages, such as previous and next page identifiers, and many rows, such as heap row identifier pointers and B-Tree traversal pointers, it is currently impractical to move files or file groups from one database to another. However, with the aspects of the current invention, the file identifiers need only be unique within the recovery unit. As a consequence, a recovery unit can be copied or moved from one database to another. FIG. 5 provides an example of this feature.

Recovery unit b (504) of database x 500 is one of many recovery units 502, 506 of database x in FIG. 5. It may be desirable to copy the data contents to database y 510 of FIG. 5 and have the elements of recovery unit 504 become part of database y. Notice that the number of recovery units in the each database is not a factor as database x has N recovery units and database y has only two before the transfer. That is, recovery units p 512 and q 514U may be pre-existing in database y 510.

Using aspects of the current invention, the data of recovery unit 504 may be copied from database x 500 to database y 510 by using a recovery unit as the transferable unit. Once the recovery unit 504 is copied from database x to database y, its contents are preserved, but it may adopt a naming convention compatible with the new database. Thus, the old recovery unit b (504), once copied into database y, may become recovery unit r 504' whose name is compatible with database y. The newly added recovery unit 504' in database y has a name space distinct from that of its companion recovery units 512 and 514. The new name space may also be distinct from the source recovery unit 504 in database x as well.

Figure 6:
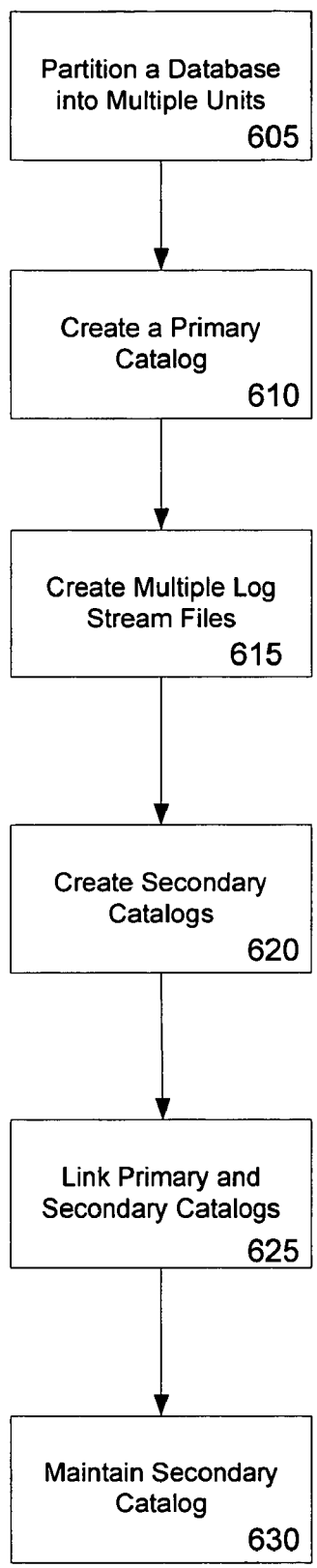
FIG. 6 illustrates an exemplary flow diagram of the creation of a recovery unit as embodied in the present invention.

FIG. 6 depicts a flow diagram of a general method for one embodiment of the current invention. A database may be partitioned into multiple units for use as recovery units in step 605. A primary catalog as described above is created in step 610. The primary catalog may contain the logical metadata elements for a recovery unit. Multiple log stream files may be created in step 615 such that only one log stream is associated with a particular recovery unit, although, multiple recovery units may share a single log stream file. In one embodiment there are preferably as many log stream files as there are recovery units. Secondary catalogs may be created in step 620. The secondary catalogs created may contain the physical metadata elements of a respective recovery unit. The two types of catalogs may be linked in step 625 such that they refer to distinct recovery units. Thus the framework of recovery units may be established. The user of system may then be able to maintain the secondary catalogs such that if a recovery unit need be exercised, it can perform off line without affecting the availability of the remaining recovery units.

Figure 7:
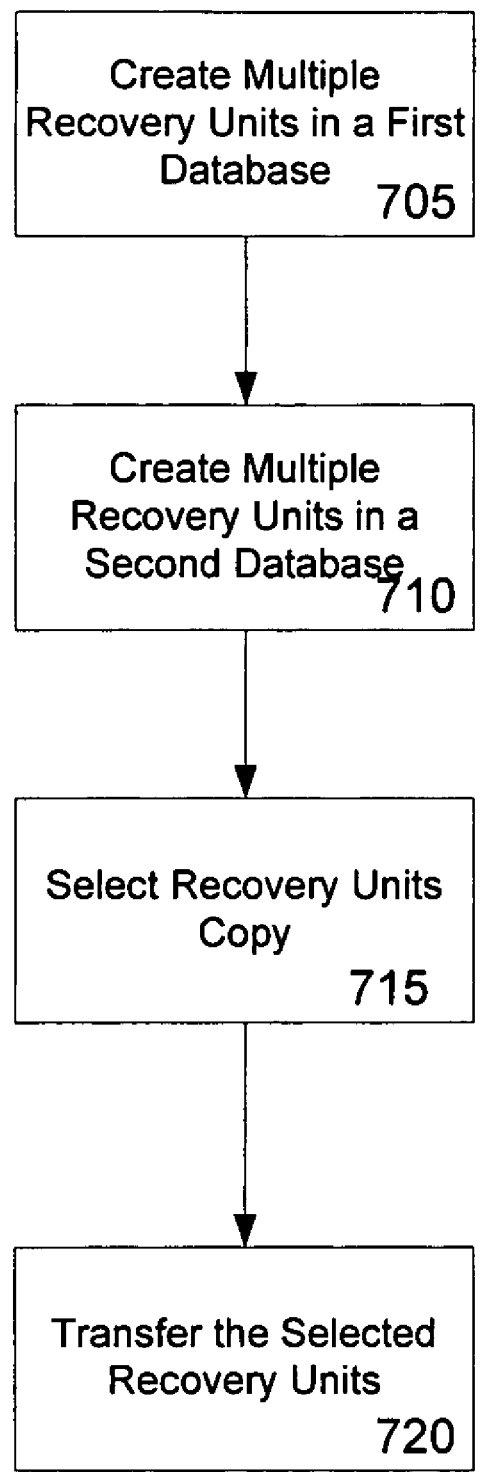
FIG. 7 illustrates an exemplary flow diagram of an embodiment of the present invention used for recovery unit transfers between databases.

Thus created, recovery units may be used to advantage to maintain or recover portions of the database off line from other recovery units within the same database. Additionally, the framework of recovery units allows the transfer of one or more recovery units from one database to another. FIG. 7 depicts a flow diagram for a method of copying one or more portions of a database structured as recovery units from one database to another.

Initially, in step 705, one or more recovery units may be created in a first database according the method of FIG. 6. Then, one or more recovery units may be created in a second database in step 710. To perform a transfer, a selection must be made as to which recovery units are desired to be transferred from the first database to the second database in step 715. The selected recovery units may then be copied, and thus transferred into the second database in step 720. The transferred recovery units are thus tied to the new database and are accessible to the second database assuming their structure matches that of the first database.

Moving back to discuss operations within a single database, in a different embodiment of the invention, multiple filegroups may be tied to the same log. For example, a user may have one filegroup per recovery unit. Each recovery unit may have a principal filegroup that contains its physical metadata catalog. This principle filegroup may be the catalog for both methods of access to the recovery unit and file management. For example, each database may have a primary recovery unit that is used to bootstrap the database and the other recovery units. The primary recovery unit may contain all the physical metadata, plus enough physical metadata to find and start the secondary recovery units at startup time. Secondary recovery units contain a catalog of logical metadata. In one embodiment, each recovery unit contains one principal filegroup, and the primary filegroup for the database is a principal filegroup. A primary filegroup may contain the single logical catalog for the database and enough information for the physical metadata to bootstrap the secondary recovery units. The primary filegroup may exists only in the primary recovery unit. Additionally, the primary recovery unit may have new catalog entries needed to find the non-primary or lower tier recovery units. A principal filegroup's name may be the access point for the CREATE/ALTER DATABASE syntax.

In one embodiment, the invention may be used in a structured query language (SQL) environment available from Microsoft Corporation of Redmond, Wash. In that environment, the states of a recovery unit may mirror the states of a database and the overall database state may be tied to the state of a primary recovery unit. The lock space for the recovery units may be the same as that of the database when the recovery units are online. When moving to some other state, it may be desirable to transition to a lock space. This transition may necessitate an initial brief exclusive lock on the whole database to take the recovery unit out of online, but is not needed to take it back online later. In most cases, there will actually be no user-visible transition period because the initial state will likely not be ONLINE. Under one embodiment, one may leverage off of the existing database management state transition framework but apply it to a recovery unit instead of the entire database. Under one embodiment, the following database states may apply to both the database and the recovery units:

ONLINE

OFFLINE

RESTORING
RECOVERING
RECOVERY PENDING
SUSPECT
EMERGENCY

In the SQL environment, many of the states are default or transitional states. The RESTORING state will be reached by attempting to RESTORE any file or filegroup within the recovery unit. For the OFFLINE and EMERGENCY states, one may preferably need to determine syntax to allow the admin to force a state change. One may also preferably need to determine if these are useful states for recovery units. Ideally, one does not expose any syntax that refers to "Recovery Unit".

In a SQL environment, during long recovery scenarios, a database may be available as soon as the primary recovery unit is available. The recovery unit that is undergoing the long recovery will be "Recovering" and all its filegroups may be unavailable to users. However, other non-primary recovery units may be recovered while the balance of the database is available.

Redo/undo recovery may occur on a per-recovery unit basis and may preferably require current calls to be redirected from the database to the recovery unit. There is no special casing and in general recovery does not have to work with the database, only the recovery unit. Recovery may be multi-threaded on the different recovery units as well as on CHECKPOINT.

In a SQL environment, the recovery mode of a database (FULL, SIMPLE, BULK_LOGGED) may apply to all recovery units. In addition, recovery units may provide the opportunity to have multiple logs per database with little or no overhead to current database components.

In one aspect of the invention, the basic framework may be leveraged to easily allow tables or database partitions to be moved/merged from one database or server to another database or server. This may be accomplished via file copy/attach or restore with logical and physical metadata. With this capability, different recovery units may have the same file identifiers that are unique within the recovery unit, not unique within the database.

In one embodiment, one internal interface to the database, the DBTABLE, may remain the same for most components outside the core physical metadata. The components of the physical metadata may reference a recovery unit instead of the DBTABLE.

In one embodiment, a collection of files, filegroups and log files may be used in a recovery unit. The recovery unit may be created by designating a principal filegroup in the CREATE or ALTER DATABASE statements. For CREATE DATABASE, each new principal filegroup preferably comes after the log for which the previous recovery unit has been designated. Preferably, log files may be specified for each principal filegroup. In this embodiment, the CREATE DATABASE syntax diagram may be expressed as follows:

```
CREATE DATABASE {database_name}
[ ON
    [ PRIMARY ]
    <filelist> [, <recoveryunitlist>
<recoveryunitlist> ::=
    PRINCIPAL filegroup_name <filelist>
<filelist> ::=
    [ < filespec > [ ,...n ]]
    [, < filegroup > [ ,...n ]]
]
```

```
[ LOGON { < filespec > [ ,...n ] } ]]
    < filespec > ::=
[ NAME = logical_file_name,]
    FILENAME = 'os_file_name'
    [, SIZE = size ]
    [, MAXSIZE = { max_size | UNLIMITED } ]
    [, FILEGROWTH = growth_increment] ) [ ,...n ]
    < filegroup > ::=
FILEGROUP filegroup_name
    [ CONTAINS { ROWS | FILESTREAM | FILESTREAM_LOG } ]
        [ DEFAULT ]
        [ LOG ON { log_filegroup_name | PRIMARY_LOG } ]
< filespec > [ ,...n ]
```

In the current embodiment, to create a recovery unit requires a new syntax for the ALTER DATABASE instruction to allow a file list to be appended after the filegroup name. A statement adding an entire recovery unit may appear as:
ALTER DATABASE {database_name}
  ADD PRINCIPAL FILEGROUP {filegroup_name}<filelist>

For data files, adding files to an existing recovery unit may be the same as adding files to a filegroup. For log files, an extension to the ALTER DATABASE syntax may be desired so that ADD LOG FILE can also specify a filegroup name. That filegroup name should be the principal filegroup in the recovery unit.
ALTER DATABASE database_name
{ADD LOG FILE <filespec>[, . . . n]
[TO FILEGROUP principal_filegroup_name]

Similarly, for adding filegroups to a recovery unit, a clause indicating the principal filegroup for that recovery unit may be added:
ALTER DATABASE database_name
ADD FILEGROUP filegroup_name
[TO FILEGROUP principal_filegroup_name]

Changing the state of a recovery unit can be similar to changing the state of the database except that the MODIFY FILEGROUP clause may be used with the principal filegroup name.
ALTER DATABASE database_name
MODIFY FILEGROUP filegroup_name SET <optionspec>[, . . . n]
[WITH <termination>]

The RESTORE DATABASE syntax generally already contains options for a file or filegroup. As one aspect of the invention, the file or filegroup option may be extended to the RESTORE LOG statement as well so that only the log for that recovery unit will be affected.
RESTORE LOG {database_name|@database_name_var}
<file_or_filegroup>[, . . . n]
[FROM <backup_device>[, . . . n]]

Note that the numeric identifiers (IDs)s assigned to the filegroups and files within a recovery unit overlap between recovery units. That is, each recovery unit has files 1 and 2 for its primary data and log files. Each recovery unit has filegroup 1 for its system tables. The rationale for this is multifold:

(a) The feature extends the commonly available limit of 32,767 files per database.

(b) In currently available systems, a typical limit is 32, 767 filegroups per database. Using recovery units, one may multiply the maximum number of filegroups by the number of recovery units allowed.

(c) A recovery unit may stand alone and be easily moved to another database; this move may be a move of an entire table or database partition to a new database or server As a consequence of the above mentioned overlap, row identifiers may no longer be unique within a database, but rather within a recovery unit. A non-clustered index over a heap may contain a row identifier that may not exist in the indexes of the recovery unit.

In one embodiment, creating a database with two recovery units may be implemented as in the following example.

Recovery unit 1 has just 1 filegroup; a primary recovery unit. Recovery unit 2 has two filegroups; primary (SalesGroup1) and secondary (SalesGroup2).

```
CREATE DATABASE Sales
ON PRIMARY
( NAME = SPri1_dat,
    FILENAME = 'D:\Data\SPri1dat.mdf',
    SIZE = 10,
    MAXSIZE = 50,
    FILEGROWTH = 15% ),
( NAME = SPri2_dat,
    FILENAME = 'E:\data\SPri2dt.ndf',
    SIZE = 10,
    MAXSIZE = 50,
    FILEGROWTH = 15% ),
LOG ON           -- log for principal recovery unit
( NAME = 'Sales_log',
    FILENAME = 'F:\log\salelog.ldf',
    SIZE = 5 MB,
    MAXSIZE = 25 MB,
    FILEGROWTH = 5 MB ),
PRINCIPAL FILEGROUP SalesGroup1 -- new recovery unit
( NAME = SGrp1Fi1_dat,
    FILENAME = 'K: data SG1Fi1dt.ndf',
    SIZE = 10,
    MAXSIZE = 50,
    FILEGROWTH = 5 ),
( NAME = SGrp1Fi2_dat,
    FILENAME = 'L:\data\SG1Fi2dt.ndf',
    SIZE = 10,
    MAXSIZE = 50,
    FILEGROWTH = 5 ),
FILEGROUP SalesGroup2 - second filegroup in second recovery unit
( NAME = SGrp2Fi1_dat,
    FILENAME = 'M:\data\SG2Fi1dt.ndf',
    SIZE = 10,
    MAXSIZE = 50,
    FILEGROWTH = 5 ),
( NAME = SGrp2Fi2_dat,
    FILENAME = 'N:\data\SG2Fi2dt.ndf',
    SIZE = 10,
    MAXSIZE = 50,
    FILEGROWTH = 5 )
LOG ON           -- log for second recovery unit
( NAME = 'Sales_log2',
    FILENAME = 'O:\log\salelog2.ldf',
    SIZE = 5 MB,
    MAXSIZE = 25 MB,
    FILEGROWTH =5 MB )
GO
```

In one embodiment, adding tables to different recovery units may be implemented as in the following example. To add tables or indexes to different filegroups, a user may specify an append an "ON" clause to the CREATE TABLE or CREATE INDEX statement. For instance, with the above created add database you might have the PurchaseOrderDetail table on the SalesGroup1 recovery unit, but the customers table on the PRIMARY recovery unit.

```
CREATE TABLE [dbo].[PurchaseOrderDetail]
(
    [PurchaseOrderID] [int] NOT NULL,
    [LineNumber] [smallint] NOT NULL,
    [ProductID] [int] NULL,
    [UnitPrice] [money] NULL,
    [OrderQty] [smallint] NULL,
    [ReceivedQty] [float] NULL,
    [RejectedQty] [float] NULL,
    [DueDate] [datetime] NULL)
)
ON [SalesGroup 1]
GO
CREATE TABLE [customers]
(
    Id int NOT NULL,
    name [nvarchar(200)] NOT NULL,
    address [nvarchar(2000)] NOT NULL)
ON [PRIMARY]
GO
```

In one embodiment, a new ALTER DATABASE syntax may be used to add a new recovery unit to an existing database.

```
ALTER DATABASE Sales
ADD PRINCIPAL FILEGROUP SalesGroup3 - third recovery unit
( NAME = SGrp3Fi1_dat,
    FILENAME = 'P:\data\SG3Fi1dt.ndf',
    SIZE = 10,
    MAXSIZE = 50,
    FILEGROWTH = 5 )
LOG ON           -- log for third recovery unit
( NAME = 'Sales_log3',
    FILENAME = 'Q:\log\salelog3.ldf',
    SIZE = 5 MB,
    MAXSLZE = 25 MB,
    FILEGROWTH = 5 MB)
GO
```

In one embodiment, an example of an aspect of the invention exhibiting availability and recovery of filegroups may be appreciated from the following scenario. Database FOO has principal filegroups, A (the primary), B, C, D, and E. Assume that a drive fails which contains data files in a filegroup from C. Additionally, there is a physical file corruption of files owned by a filegroup from E. At the database startup, the filegroup A is responding, accordingly, the initial database state is ONLINE. However, C's state is "Recovery Pending" due to the missing files and E fails recovery due to the corruption so is marked "Suspect". The after startup states appear as follows:

| Database State | Filegroup State |
| --- | --- |
| FOO->ONLINE | A –> ONLINE |
| | B->ONLINE |
| | C->RecoveryPending |
| | D->ONLINE |
| | E->Suspect |

The problem with the C drive is resolved as a power cable that was unplugged. This is corrected and the files are now available. A user may use the ALTER DATABASE statement to set C online:

ALTER DATABASE FOO MODIFY FILEGROUP C SET ONLINE

The C drive recovers and is now available. The states now appear as:

| DatabaseState | FilegroupState |
|---|---|
| FOO->ONLINE | A->ONLINE |
| | B->ONLINE |
| | C->RecoveryPending -> Recovering -> ONLINE |
| | D->ONLINE |
| | E->Suspect |

Users accessing data in filegroups A, B, and D were unaffected by the transition of the C drive to ONLINE. Drive D's data files are physically damaged and they need to be restored. Since the filegroup is not ONLINE, the transition to RESTORING occurs without affecting users of the other filegroups. The entire database's log is backed up, including the tail of the log for drive C:
BACKUP LOG foo TO DISK='e:\logtail.dmp'
Drive C's data files are restored from the last database backup. This transitions drive C to the RESTORING state:
RESTORE DATABASE FOO C FROM DISK='e:\fulldb-backup.dmp' WITH NORECOVERY

| DatabaseState | FilegroupState |
|---|---|
| FOO->ONLINE | A->ONLINE |
| | B->ONLINE |
| | C->Suspect -> Restoring |
| | D->ONLINE |
| | E->ONLINE |

Drive C's log is restored up to the failure point, and drive C is recovered and made available:
RESTORE LOG FOO C FROM DISK='e:\logbackup.dmp' WITH NORECOVERY
RESTORE LOG FOO C FROM DISK='e:\logtail.dmp' WITH RECOVERY

| DatabaseState | FilegroupState | | |
|---|---|---|---|
| FOO->ONLIINE | A->ONLINE | | |
| | B->ONLINE | | |
| | C->Restoring | C->Recovering | C->ONLINE |
| | D->ONLINE | | |
| | E->ONLINE | | |

Exemplary Computing Device

Figure 8:
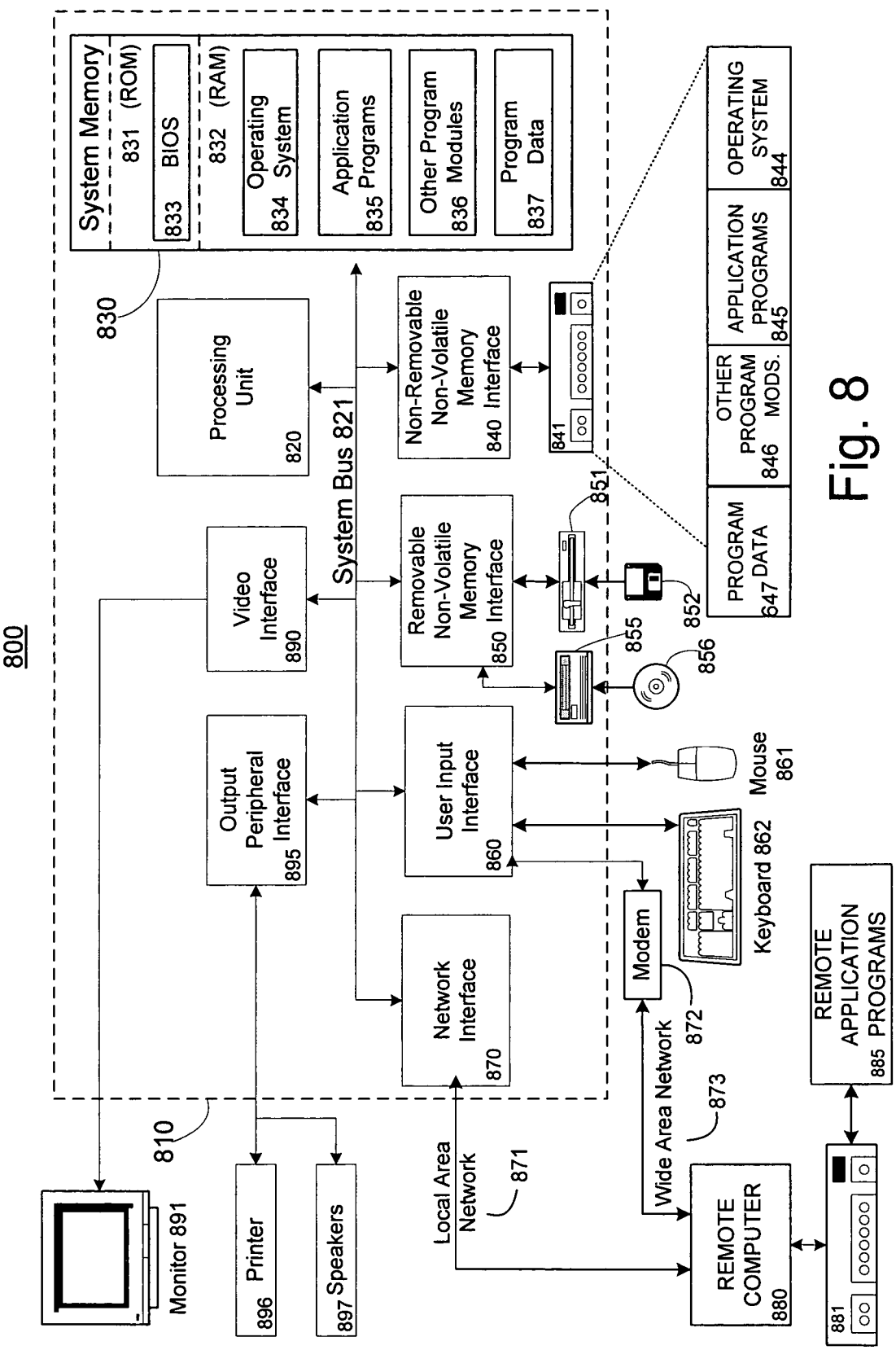
FIG. 8 is a block diagram showing an exemplary computing environment in which aspects of the invention may be implemented.

FIG. 8 and the following discussion are intended to provide a brief general description of a suitable computing environment in which embodiments of the invention may be implemented. While a general purpose computer is described below, this is but one example, and embodiments of the invention may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 8 thus illustrates an example of a suitable computing system environment 800 in which the embodiments of the invention may be implemented, although as made clear above, the computing system environment 800 is only one example of a suitable computing environment and is not intended to suggest any limitation as to the scope of use or functionality of an embodiment of the invention. Neither should the computing environment 800 be interpreted as having any dependency or requirement relating to any one or combination of components illustrated in the exemplary operating environment 800.

With reference to FIG. 8, an exemplary system for implementing an embodiment of the invention includes a general purpose computing device in the form of a computer system 810. Components of computer system 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 810 typically includes a variety of computer readable media. Computer readable media can be any available media that can be accessed by computer system 810 and includes both volatile and nonvolatile media, removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer system 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer system 810 may also include other removable/non-removable, volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8 provide storage of computer readable instructions, data structures, program modules and other data for the computer system 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer system 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus 821, but may be connected by other interface and bus structures, such as a parallel port, game port or a universal serial bus (USB). A monitor 891 or other type of display device is also connected to the system bus 821 via an interface, such as a video interface 890, which may in turn communicate with video memory (not shown). In addition to monitor 891, computer systems may also include other peripheral output devices such as speakers 897 and printer 896, which may be connected through an output peripheral interface 895.

The computer system 810 may operate in a networked or distributed environment using logical connections to one or more remote computers, such as a remote computer 880. The remote computer 880 may be a personal computer, a server, a router, a network PC, a peer device or other common network node, and typically includes many or all of the elements described above relative to the computer system 810, although only a memory storage device 881 has been illustrated in FIG. 8. The logical connections depicted in FIG. 8 include a local area network (LAN) 871 and a wide area network (WAN) 873, but may also include other networks/buses. Such networking environments are commonplace in homes, offices, enterprise-wide computer networks, intranets and the Internet.

When used in a LAN networking environment, the computer system 810 is connected to the LAN 871 through a network interface or adapter 870. When used in a WAN networking environment, the computer system 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer system 810, or portions thereof, may be stored in the remote memory storage device. By way of example, and not limitation, FIG. 8 illustrates remote application programs 885 as residing on memory device 881. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a partitioned recovery system for a database. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method of generating recoverable units in a database, the method comprising:
    partitioning the database into a first recovery unit and a second recovery unit, the first recovery unit and the second recovery unit part of a physical layer of the database;
    creating a primary metadata catalog comprising metadata of logical elements of the recovery units, the primary metadata catalog referencing the recovery units, the primary catalog comprising a portion of a logical layer of the database;
    creating multiple logs such that any one recovery unit is associated with only one log;
    creating two secondary metadata catalogs, each secondary metadata catalog corresponding to a respective recovery unit and comprising metadata of physical elements for the respective recovery unit;
    linking the primary metadata catalog to the secondary metadata catalogs, the linking comprising a correlation of the logical layer with the physical layer; and
    maintaining the secondary metadata catalogs such that the first recovery unit is recoverable independently from the second recovery unit, accessing the second recovery unit of the database while the first recovery unit of the database is being recovered.

2. The method of claim 1, wherein creating two secondary metadata catalogs further comprises creating two secondary metadata catalogs wherein each metadata catalog includes a log stream corresponding to the respective recovery unit.

3. The method of claim 1, wherein linking further comprises linking the primary metadata catalog to the secondary metadata catalog such that a first recovery unit is recoverable independently from the second recovery unit while the second recovery unit is being accessed.

4. The method of claim 1, wherein creating a primary metadata catalog comprises creating a metadata catalog which contains metadata for at least one of the database, tables, indexes, data types, constraints, stored procedures, triggers, and file groups.

5. The method of claim 1, wherein creating two secondary metadata catalogs comprises creating metadata catalogs which contain metadata for at least one of pages, files, B-Trees, heaps, and log data.

6. The method of claim 1, wherein maintaining comprises separately logging updates to the respective recovery units in the respective secondary metadata catalogs.

7. A system having a database, the system comprising:
    a processor having access to memory, the memory having instructions which, when executed, perform the method comprising:
    partitioning the database into a first recovery unit and a second recovery unit the first recovery unit and the second recovery unit part of a physical layer of the database;
    creating a primary metadata catalog comprising metadata of logical elements of the recovery units, the primary metadata catalog referencing the recovery units, the primary metadata catalog comprising a portion of a logical layer of the database;
    creating multiple logs such that any one recovery unit is associated with only one log;
    creating two secondary metadata catalogs, each secondary metadata catalog corresponding to a respective recovery unit and comprising metadata of physical elements for the respective recovery unit;
    linking the primary metadata catalog to the secondary metadata catalogs, the linking comprising a correlation of the logical layer with the physical layer; and
    maintaining the secondary metadata catalogs such that the first recovery unit is recoverable independently from the second recovery unit, accessing the second recovery unit of the database while the first recovery unit of the database is being recovered.

8. The system of claim 7, wherein the method step of creating two secondary metadata catalogs further comprises creating two secondary metadata catalogs wherein each metadata catalog includes a log stream corresponding to the respective recovery unit.

9. The system of claim 7, wherein the method step of linking further comprising linking the primary metadata catalog to the secondary metadata catalog such that a first recovery unit is recoverable independently from the second recovery unit while the second recovery unit is being accessed.

10. The system of claim 7, wherein the method step of maintaining comprises separately logging updates to the respective recovery units in the respective secondary metadata catalogs.

11. A computer-readable storage medium having computer-executable instructions for performing a method, the method comprising:
   partitioning the database into a first recovery and a second recovery unit, the first recovery unit and the second recovery unit part of a physical layer of the database;
   creating a primary metadata catalog comprising metadata of logical elements of the units, the primary metadata catalog referencing the recovery units, the primary metadata catalog comprising a portion of a logical layer of the database;
   creating multiple logs such that any one recovery unit is associated with only one log;
   creating two secondary metadata catalogs, each secondary metadata catalog corresponding to a respective recovery unit and comprising metadata of physical elements for the respective recovery unit;
   linking the primary metadata catalog to the secondary metadata catalogs, the linking comprising a correlation of the logical layer with the physical layer; and
   maintaining the secondary metadata catalogs such that the first recovery unit is recoverable independently from the second recovery unit, accessing the second recovery unit of the database while the first recovery unit of the database is being recovered.

12. The computer-readable medium of claim 11, wherein the step of creating two secondary metadata catalogs further comprises creating two secondary metadata catalogs wherein each metadata catalog includes a log stream corresponding to the respective recovery unit.

13. The computer-readable medium of claim 11, wherein the step of linking further comprises linking the primary metadata catalog to the secondary metadata catalog such that a first recovery unit is recoverable independently from the second recovery unit while the second recovery unit is being accessed.

14. The computer-readable medium of claim 11, wherein the step of creating a primary metadata catalog comprises creating a metadata catalog which contains metadata for at least one of the database, tables, indexes, data types, constraints, stored procedures, triggers, and file groups.

15. The computer-readable medium of claim 11, wherein the step of creating two secondary metadata catalogs comprises creating metadata catalogs which contain metadata for at least one of pages, files, B-Trees, heaps, and log data.

16. The computer-readable medium of claim 11, wherein the step of maintaining comprises separately logging updates to the respective recovery units in the respective secondary metadata catalogs.

* * * * *